Figure 1:
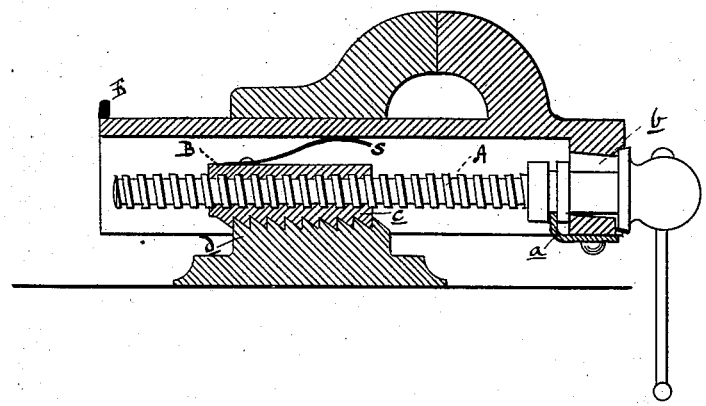

(No Model.)

A. MONTANT.
VISE.

No. 347,366.   Patented Aug. 17, 1886.

Witnesses:
A. H. Lazie
C. H. Pennell

Inventor:
Alphonse Montant

UNITED STATES PATENT OFFICE.

ALPHONSE MONTANT, OF NEW YORK, N. Y.

VISE.

SPECIFICATION forming part of Letters Patent No. 347,366, dated August 17, 1886.

Application filed December 28, 1885. Serial No. 186,956. (No model.)

*To all whom it may concern:*

Be it known that I, ALPHONSE MONTANT, of New York, in the county of New York and State of New York, have invented a new and useful Improvement in Vises, of which the following is a specification.

My invention relates to the kind of vise in which the jaws can quickly be adapted to the size of any object to be held, which is impossible with the ordinary screw and stationary nut. To accomplish the object, I insert, instead of the usual nut in the stationary jaw, teeth adapted to receive the teeth or serrations of a nut or sleeve, which is threaded to fit the screw which passes through it, the screw being sufficiently loosely held in the head of the movable jaw, in any suitable manner, to have a certain amount of play, in order that by means of the handle a tilting motion is imparted to the screw, whereby the nut is lifted from the teeth in the stationary jaw, thus "unlocking" the parts and allowing of quick adaptation of the jaws to any width.

In the drawings I show my invention adapted to an ordinary vise. The simplicity of the device admits of its easy adaptation to any parallel-jaw vise.

Figure 2:
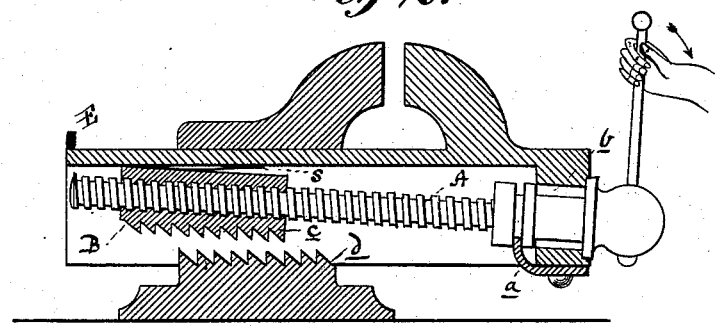

Figure 1 represents a side view showing the parts locked. Fig. 2 shows the parts unlocked, when the movable jaw is free to be pushed in or pulled out from the stationary jaw.

In Fig. 1, A, the screw, (held at $a$ in a manner plainly shown, the space $b$ in the head of the jaw allowing of the position in which it is held in Fig. 2,) passes through the nut B, which is threaded to receive it, and fits snugly to the sides of the box part of the movable jaw, and has the serrations $c$, which fit in with the serrations $d$ in the stationary jaw. E is a stop that prevents the sliding jaw from being pulled all the way out, and S is a spring, preferably attached to the nut to help hold said nut down.

In Fig. 2, the handle being seized in the manner shown and pulled in the direction of the arrow, the screw, and consequently the nut, is raised and freed from the lower serrations. The sliding jaw can now be pushed against any object to be held, when, the handle being allowed to resume its vertical position, the serrations of the nut B fit in with the lower serrations, as shown in Fig. 1. The nut being now held, any turn of the screw to the right will tighten the grip on the object held. To release said object, the screw is revolved somewhat to the left. Then, if it is desired to "unlock" the parts, the handle being placed in the position shown in Fig. 2, the motion in the direction of the arrow is imparted, resulting in the freeing of the parts. The nut can be made of any weight and the serrations of any shape that may be found desirable.

What I claim, and desire to have Letters Patent granted for, is—

1. Serrations in the stationary jaw of a vise arranged to fit with serrations on a nut which is threaded on the screw, held so as to tilt by the sliding jaw, whereby a downward motion of the handle end of the screw causes a separation of the parts, as set forth.

2. In combination, serrations in the stationary jaw of a vise arranged to fit with serrations in a nut which is threaded on the screw, held so as to tilt in the sliding jaw, and a depressing-spring, whereby the parts are separated or engaged, as set forth.

ALPHONSE MONTANT.

Witnesses:
A. H. LASEL,
C. H. PEUNELL.